(12) United States Patent
Patton et al.

(10) Patent No.: US 6,433,888 B1
(45) Date of Patent: Aug. 13, 2002

(54) AUTO RESTORATION OF A PRINT

(75) Inventors: David L. Patton, Webster; John R. Fredlund, Rochester; John D. Buhr, Webster, all of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/385,268

(22) Filed: Aug. 30, 1999

Related U.S. Application Data

(63) Continuation-in-part of application No. 09/211,234, filed on Dec. 14, 1998.

(51) Int. Cl.[7] .............................. G03F 3/10; G06K 9/00; G03B 17/24
(52) U.S. Cl. ...................... 358/1.18; 358/527; 382/100; 396/311
(58) Field of Search ................................ 358/1.18, 447, 358/448, 452, 527; 382/100, 112, 232, 325; 396/311, 210; 346/74.5, 74.2

(56) References Cited

U.S. PATENT DOCUMENTS

| | | | | |
|---|---|---|---|---|
| 4,951,086 A | * | 8/1990 | Hicks | 355/41 |
| 5,196,859 A | * | 3/1993 | Tomiyama | 396/332 |
| 5,745,217 A | | 4/1998 | Factor | 396/311 |
| 5,835,639 A | | 11/1998 | Honsinger et al. | 382/278 |
| 5,859,920 A | | 1/1999 | Daly et al. | 382/115 |
| 5,905,819 A | | 5/1999 | Daly | 382/284 |

FOREIGN PATENT DOCUMENTS

WO    WO 96/33443    10/1996

\* cited by examiner

*Primary Examiner*—Kimberly A. Williams
(74) *Attorney, Agent, or Firm*—Frank Pincelli

(57) ABSTRACT

A method and system for encoding data onto a pictorial hardcopy print made by digital printing or digital record file of image so that the image may be reproduced or displayed as originally produced and/or captured and in accordance with a personal printing/display profile.

11 Claims, 4 Drawing Sheets

AUTO RESTORATION OF A PRINT

CROSS-REFERENCE TO RELATED APPLICATIONS

This is a continuation-in-part of Ser. No. 09/211,234 U.S. Pat. No. 6,304,345 filed Dec. 14, 1998, entitled AUTO RESTORATION OF A PRINT, by David L. Patton et al.

FIELD OF THE INVENTION

The present invention relates to encoding data onto a pictorial hardcopy print so that when the pictorial hardcopy print is digitally scanned by a scanner for reprinting and/or displaying of the image on the hardcopy print, the data provided on the print can be used to restore the image to its original condition as produced and/or captured.

BACKGROUND OF THE INVENTION

Currently, when one desires to obtain a copy of a print, such as a photographic print, one would either provide the negative from which the image was made, or scan the print and use that information to reprint or display the image. With regard to using the film negative from which the print is made, this is generally difficult for the consumer, as in many instances the original negative is either lost, or inaccessible. In the case of an image obtained from a digital camera, the original file is often lost or in accessible. The use of the print for scanning so as to obtain the image presents other problems. Typically, the dyes present in the print deteriorate with time and under certain illuminations can be greatly deteriorated. In any event, the image obtained is directly related to the image as it currently exists at the time of scanning.

It has been suggested that when prints are produced optically from film onto photographic paper, that exposure information used for printing be provided on the back of the print, and in some instances, provide additional information relating to the specific film from which the print has been made. However, this information is limited in that it can only be used for reprinting on optical printers and does not take into account the current condition of the image from which the reproduction is being made.

U.S. Pat. No. 4,951,086 to Hicks discloses encoding information with a photographic film or paper to enable identification and general exposing information for the film to produce the aim print.

U.S. Pat. No. 5,225,900 to Wright discloses a method of encoding a plethora of information about a print, including a history of changes to the image, instructions on how many copies to make, which parts of the image to copy, etc., as taggants combined with the colorants forming an image. These taggants, which should not be visible to human observers under normal viewing conditions, are identified by a copying system and are decoded to provide copying information.

U.S. Pat. No. 5,796,874 to Woolfe et al discloses a method for restoring the appearance of the original print in a copy by using a model of the fading mechanism of the original print material along with a human observer to adjust the fading mechanism parameters to produce a pleasing print.

U.S. Pat. No. 4,717,646 to Lewis has described a method for restoring an original print to its original appearance using a chemical process.

U.S. Pat. No. 5,212,518 to Numakura et al discloses a method of reproducing a halftone copy of a current print, but in a manner that restored the appearance of the original print. This method proposes scaling the densities in the current print by the ratio of the assumed maximum density of the original print material to the darkest pixel densities in the current image prior to converting the result pixel densities to their corresponding halftone parameters. While this method may provide some improvement, it will not produce an accurate reproduction of the original unfaded print in many cases because it assumes a linear-in-density print material fading function, a known maximum density value for the print material which may be difficult to obtain for old materials, and that the original scene had pixel densities equal to the maximum R, G and B densities in the print material.

In the prior art discussed above, when an image on a print is scanned and digitized and a hardcopy is produced using a digital printer, for example, but not limited by, a CRT printer, a LED printer, a laser printer, a thermal printer, an inkjet printer, or any other printing process, no effort is made to provide data on the original image, which can be used to later reproduce the image in its original state. Typically, in prior art devices, when a hardcopy print is scanned, it is later produced from the condition from which it was scanned. In order to restore an image to its original condition as captured, thereby reducing the effects of fading or other type of image degradation, an operator has had to intervene and use a computer with image processing capabilities to correct the errors due to degradation. Typically, an operator would use computer algorithms to restore the image to a state that is determined by hypothetical standards. In other situations information that may have been stored on the back or other portions of the print is used to recreate the printing conditions under which the original image was made. However, in these cases there is no information utilized which is directed to the colorimetric condition of the image as originally produced or captured.

Thus, in the prior art there has not been disclosed a simple and economic way to create a hardcopy reproduction or a display that accurately portrays the image as it was originally produced or captured without accessing the original captured film (assuming that the film has not deteriorated), or digital file. The prior art methods have dealt with many aspects of reproducing a copy that resembles the image, but does not restore the image to the original parameters under which it was originally produced and/or captured.

U.S. Pat. No. 5,841,885 to Neff et al discloses providing a print having all the original image information that is provided to form the image. However, this procedure requires a large amount of digital information to be placed on the print. One problem that this presents is that it is substantially more expensive to provide such detailed information due to the large amount of information necessary. In addition, this technique presents a greater risk that the portion containing this data could be damaged, thus reducing its ability to reprint the image.

The present invention provides an improved hardcopy print and a method of making the same whereby reprints can be made to the original conditions as originally produced and/or captured using information that can be easily scanned from the print.

SUMMARY OF THE INVENTION

The present invention is directed to overcoming one or more of the problems set forth above. Briefly summarized, according to one aspect of the present invention, there is provided a print having an image formed thereon, the print having information data relating to a personal printing or display profile of a customer.

In accordance with another aspect of the present invention, there is provided a print having information data relating about the print as originally printed, said information data relating to how the print was formed.

In accordance with another aspect of the present invention, there is provided a method of reprinting an image provided on a print, comprising the steps of:

a) digitally scanning an image and informational data provided on a print, the informational data containing a colorimetric value of at least one specific area of the image and information relating to the location of the at least one specific area, the digital scanning operation also obtaining the current colorimetric value of the at least one specified area;

b) comparing the current colorimetric value of the at least one specified area to the colorimetric value provided in the informational data for the at least one specific area; and c) adjusting the scanned image of the print in accordance with the information with respect to a personal printing or display profile.

The above, and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

Figure 1:
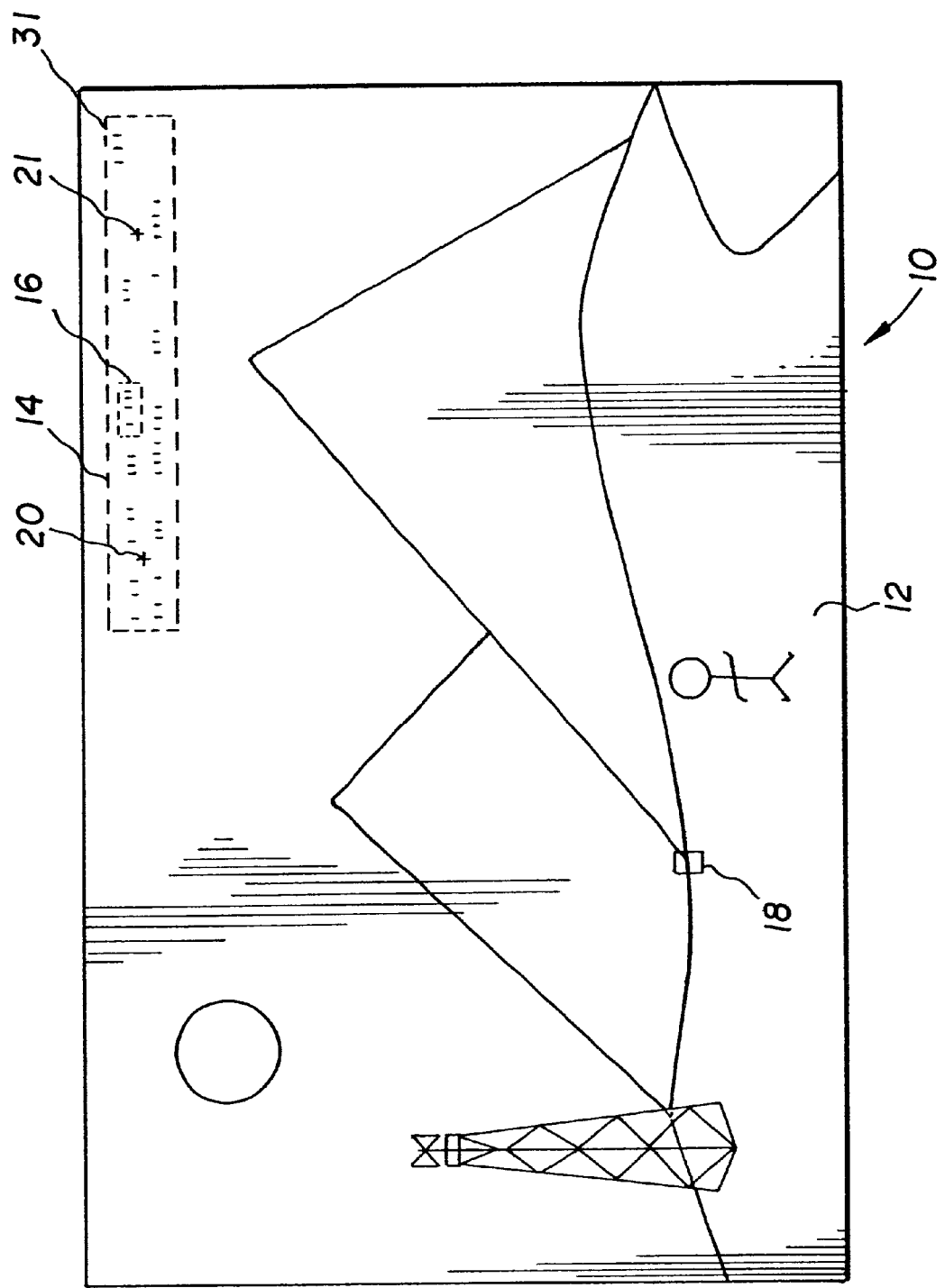
FIG. 1 is a print made in accordance with the present invention having an image placed thereon, which includes embedded data that is to be used to reproduce the image to the conditions under which it was first captured or produced.
Figure 2:
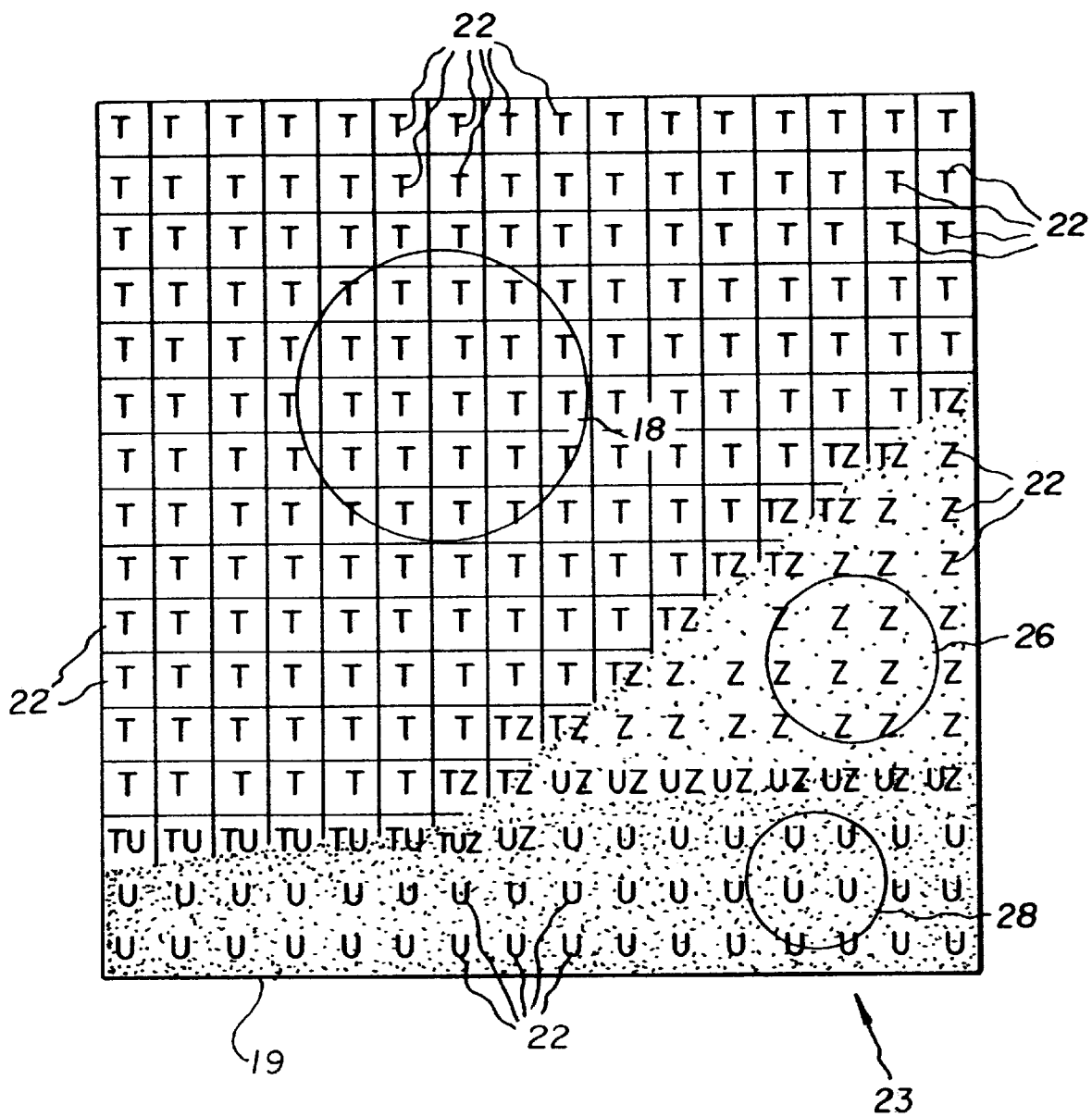
FIG. 2 is an enlarged view of a portion of the print of FIG. 1 as indicated by numeral 18.

Referring to FIG. 1, there is illustrated a print 10 made in accordance with the present invention. The print 10 includes a digital image 12 placed thereon by a variety of known digital printing techniques. In the embodiment illustrated, print 10 is a photographic print having a color image formed thereon by a digital printer. However, print 10 may be any other type hardcopy print formed by any desired digital printing technique, for example, but not by way of limitation, a thermal printer, inkjet printer, LED printer, or laser printer which prints on photosensitive media or other media designed for use with digital printers. In the preferred embodiment, informational data 14 is provided on the print in the area of the image 12 in a manner that is visually indistinguishable from the image 12. An example of providing such informational data is set forth in U.S. Pat. No. 5,859,920, issued Jan. 12, 1999, by Scott J. Daly et al, entitled METHOD FOR EMBEDDING DIGITAL INFORMATION IN AN IMAGE; U.S. Pat. No. 5,905,819, issued May 18, 1999, by Scott J. Daly, entitled METHOD AND APPARATUS FOR HIDING ONE IMAGE OR PATTERN WITHIN ANOTHER; U.S. Pat. No. 5,835,639, issued Nov. 10, 1998, by Chris W. Honsinger et al, entitled METHOD FOR DETECTING ROTATION AND MAGNIFICATION IN IMAGES; and U.S. Pat. No. 6,044,156, issued Mar. 28, 2000, by Chris W. Honsinger et al, entitled METHOD FOR GENERATING AN IMPROVED CARRIER FOR USE IN AN IMAGE DATA EMBEDDING APPLICATION, which are hereby incorporated by reference. The informational data 14 is printed in a form that can be read or observed by a normal digital scanner. The informational data 14 is provided on the digital print 10 during creation of the print 10. The information data 14 includes a code 16 which can be used for determining what is contained in the informational data 14. The code 16 includes information data that designates that the print 10 contains information that can be used for reprinting or displaying the image 12 to its form as originally printed and/or captured. The code 16 may specify the color and density for regions of the image along with their physical coordinates, that enables a copy algorithm to reproduce the image 12 as originally captured or printed. The code 16 may also provide pointers that point to certain sub-routines (algorithms) and databases which can provide information such as the fade characteristics of the print media, the frequency response of the media, the resolution at which the print 10 was printed, the type of printing device that was used to produce the print 10, the spectral characteristics of the image dyes, or any other information that may be relevant to reproducing the image. The code may also specify or identify a personal printing or display profile of a particular customer. The printing or display profile may be provided on the printer or stored in a local or remote memory device that is accessible based on the code 16 printed on the print. The personal profile may be directed to particular desired characteristics of the print or the type of printer or display preferred by that particular customer. For example, the personal printing profile may include a desired color saturation, contrast and other visual print characteristics. The printing profile may further include how the printer printed the original print, frame number, format type (panoramic, HDTV, or other), whether the print was produced from a cropped image, and/or whether the printer was a thermal printer, inkjet, silver, optical, electrophotographic, or digital printer. Preferably, the informational data 14 includes colorimetric data regarding the image 12, which in the preferred form of the invention is accomplished by providing at least one specified area 18 having a particular colorimetric value. The specified area 18 is of sufficient size so that an appropriate number of scanner pixel elements are provided having a particular colorimetric attribute. The informational data 14 preferably includes means for identifying the location of the specified area 18 as shown in FIG. 2. The informational data 14 is provided with two coordination points 20,21 such that the specified area 18 may be located with respect to points 20,21 thereto. Thus, when the print 10 is scanned, the scanner will search the print for informational data 14 as previously discussed. If informational data 14 is present, the appropriate code 16 and/or information will be read, including coordination points 20,21. Knowing the coordination points 20,21, the specified area 18 may be easily located. Additionally, colorimetric information regarding the specified area is provided in the informational data 14, which is representative of the image 12 as originally produced and/or captured. In particular, the colorimetric information may be obtained from the digital printer used to produce the print, or obtained from the capture device, such as a digital camera, that was originally used to capture the digital image. In either event, colorimetric information regarding the specified area 18 is obtained.

Figure 3:
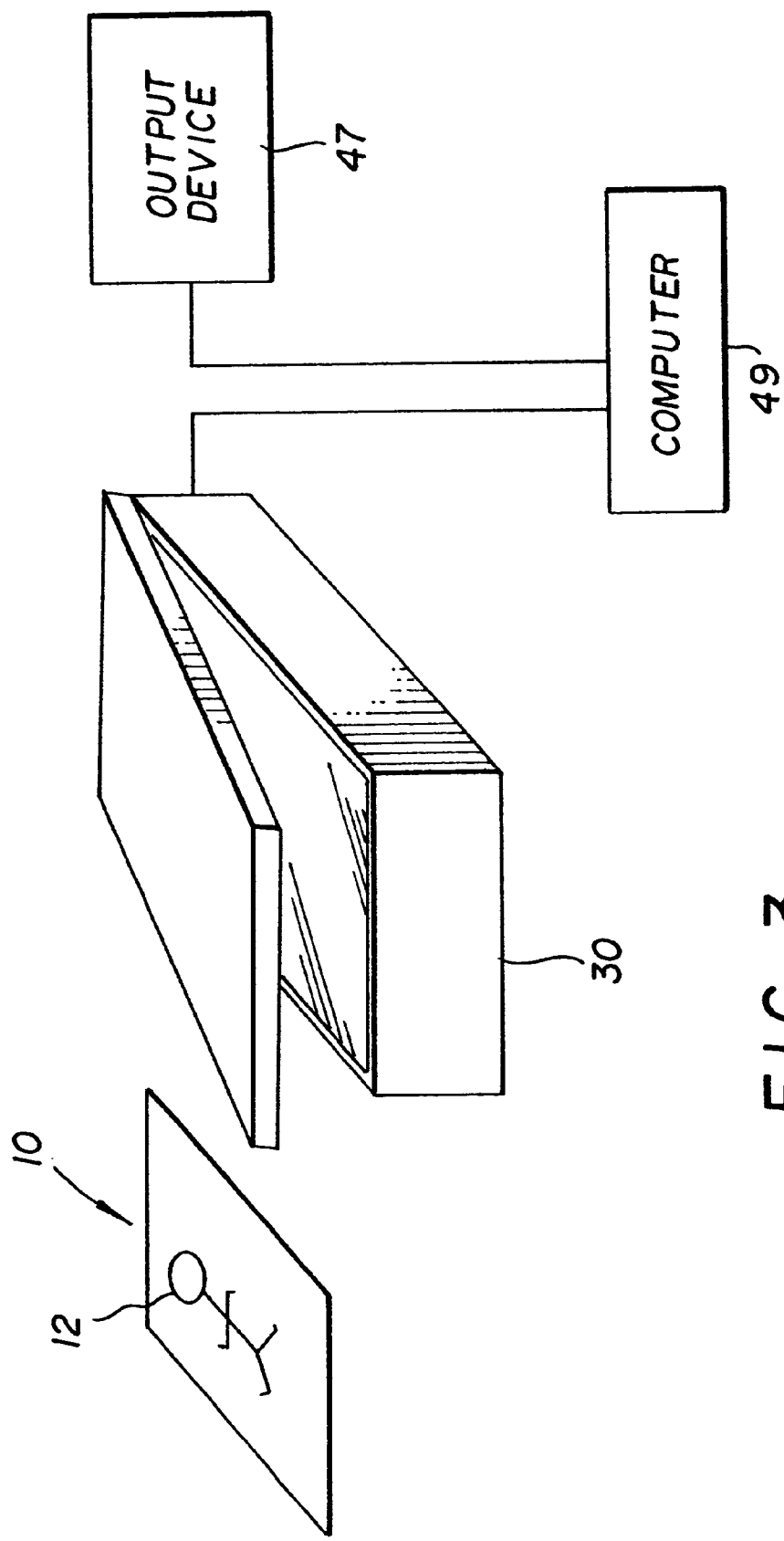
FIG. 3 is a schematic diagram of a system for scanning a print made in accordance with the present invention and for printing or displaying an image in accordance to the scanned information.
Figure 4A:
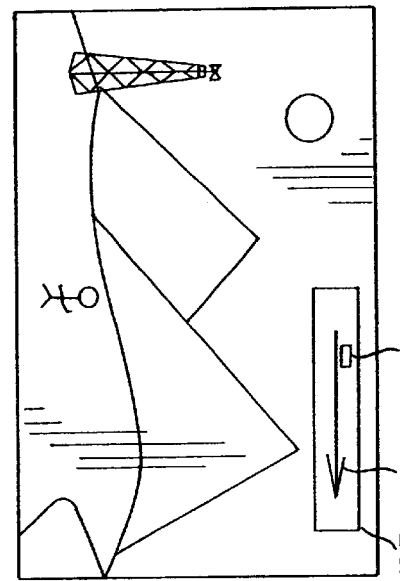
FIGS. 4a–4d illustrate how the print of FIG. 1 may be scanned in various directions for obtaining the data placed thereon.
Figure 4B:
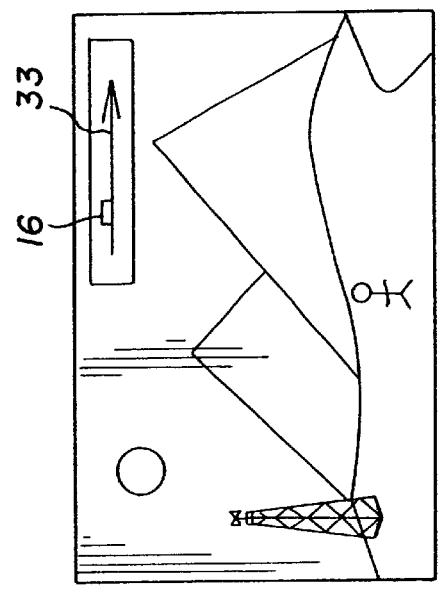
Figure 4C:
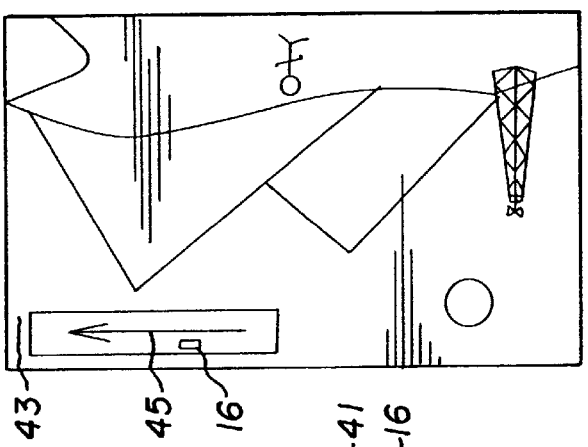
Figure 4D:
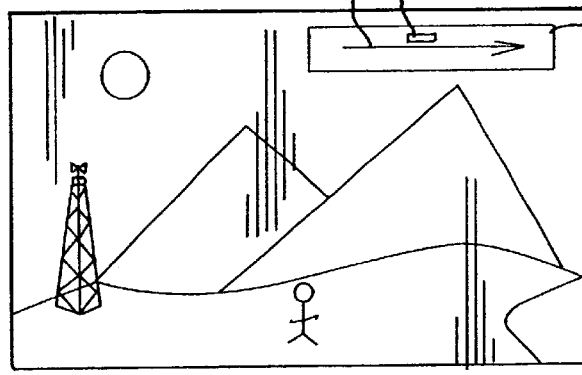

When it is desired to obtain a reprint of the image 12, or simply displaying the image 12 as originally captured and/or printed, the print 10 is passed through a typical digital scanner 30, as illustrated by FIG. 3. The scanner 30 may be of any type digital scanner as is well known by those, for example, but not by way of limitation, AVISION 630CS, HP Scanjet 5100C, UMAX Powerlook 200, and Epson ES-1200C. The image 12 on print 10 is scanned by scanner 30 thereby obtaining the appropriate information regarding image 12 as is typically done with scanners, including the current colorimetric values for image 12. The scanner 30, in the embodiment illustrated, has been programmed to recognize and read informational data 14. The scanner first determines the size and location of the print 10. The code 16 is preferably located in a specified area on the print 10, such as in the upper right quadrant 31 as illustrated in FIGS. 1 and 4a. To locate the code 16, the scanner, using preprogrammed algorithms, checks the upper right quadrant 31 and reads the code 16 in the direction indicated by arrow 33. As each successive quadrant is scanned and checked, the algorithm compensates for the change in orientation and how the code 16 would appear due to print rotation. If the print 10 were placed on the scanner 30 upside down as shown in FIG. 4b, the code 16 would be in the lower quadrant 35 and the code 16 would be upside down and read in the direction indicated by arrow 37. If the print 10 is placed on the scanner in a vertical orientation as illustrated in FIG. 4c, the code 16 would be in the lower right quadrant 39 and read in the direction indicated by arrow 41. If the print 10 is placed on the scanner 30 in a vertical orientation as shown in FIG. 4d, the code 16 would be in the upper left quadrant 43 of the print 10 and read in the direction indicated by arrow 45. It is to be understood that any appropriate identification system may used for identifying and locating code 16 and for reading the information data 14.

The colorimetric properties of the specified area 18 may be identified in informational data 14, or may be prestored in the memory and/or logic of scanner 30, or computer 49 (or remote computer or database), which is automatically recalled by reference to code 16. The colorimetric properties of area 18, as currently present in print 10, is compared with the colorimetric data of areas 18 as specified by informational data 14 or prestored in the scanner, which represents the colorimetric value of the specified area as originally captured or produced. As is typical with most prints, over time the print will degrade due to fading or degradation of the dyes in the image. This information is passed onto output device 47, which in the embodiment illustrated is a digital printer capable of printing. The informational data is then manipulated by an algorithm, in the scanner or printed, to reconstruct the image 12 as originally captured and/or printed. Alternatively, the output device 47 may be a display device which can take the image and display it in the form it was originally captured and/or produced.

Referring to FIG. 2, there is illustrated a greatly enlarged region 23 of the print 10 broken down to individual pixels 22, which includes the specified area 18. The specified area 18 is an area have a substantially uniform colorimetric value. Thus, in the preferred embodiment, the specified area 18 would be at least one area of a single uniform color, for example, red, blue, green or any other color desired. In the particular embodiment illustrated, a region 19 includes three different areas 18, 26, 28, each being indicative of a particular colorimetric value. In the embodiment illustrated, area 18 is red, area 26 is green, and area 28 is blue. Additional areas may be provided having the same or different colorimetric value. In the preferred embodiment, at least two different areas of each of the three different colorimetric values are provided at different locations. Thus, there would be six areas, two red, two green, and two blue.

The image 12 of print 10 generally changes in a predictable manner as a function of time, often proportional to image dye density. The manner is dependent on the nature of the media. To produce a copy print that matches the appearance of the original print 10 when it was originally produced or captured, the copy algorithm must know the relationship between the pixels in the scanned image and those in the original image. In the most general case, informational data 14 provided on the original print 10 enables the copy algorithm to create a change model that the copy algorithm then uses to calculate this relationship. Colorimetric values of portion 18 of the image 12 are encoded and can be used as reference data by the copy algorithm to construct a model that describes the relationship of all densities in the current image to those in the original image.

An alternative to having the copy algorithm determine the change model is to either encode the change model in the print 10, or encode a reference to the change model that is stored in a database. The copy algorithm can use the change model with the encoded data to determine the current-to-original print pixel relationship.

An advantage of the present invention is that a print fade model is determined by an algorithm that truly fits the actual fading behavior of the print material, not the assumed fading behavior. For the purposes of the present invention, the print fade model will take into account the various factors that affect the fade characteristics, for example, but not by way of limitation, the various dyes or inks used to form the image and the material from which the supporting substrate is made.

If a change model is available for the print material of the print 10 from a database selected based on encoded information on the non-image area of the front or back of the print, or on ancillary knowledge of the print material itself, or is encoded in the image 12 that describes the fading function for the actual medium on which the original image was made, colorimetric values are encoded for selected areas of the image that sample the range of colorimetric values in the image, along with their physical locations in the image. The reference areas are determined at the time of original image creation. Enough information is provided so that at the time of the copy image creation, a high quality copy image can be created. The copy algorithm creates the copy image from the current image and the change model.

If a print material change model is not available from a database, generally more reference locations are determined at the time of original image creation, for example, during digital print of print 10, based on the criteria that enable a print material change model to be calculated from the encoded information and measured information in the current image.

If a fade model is to be created by the print algorithm at the time of digital printing, a matrix of image colorimetric values, along with their physical locations, is generated prior to the creation of the original image so that this information can be encoded during printing. In the preferred case, the matrix of areas 18 is selected on the basis of the change characteristics of the print media and on the basis of the range of color record densities in the actual original image 12 to be printed. The copy algorithm at the time of scanning print 10 then retrieves the encoded information along with the scanned print pixel colorimetric values and creates a model of the colorimetric relationships between the current image and the original image, or retrieves the change model of the media as encoded on the print or from a database from an encoded reference. The copy algorithm then creates the copy image from the current image pixel values and the change model.

If the colorants (for example, the dyes or inks) in the media on which the image is to be printed or displayed are identical to those in the media of the original print 10, a simple metric such as status A density would be sufficient to specify the color appearance of the new image such that will match the original condition under which image 12 was originally produced or captured.

If the copy algorithm is to work with various types of print material colorants, it is essential that the copy algorithm know the original colorimetry of the reference areas in the print. Knowing only R, G and B, Status ISO A print density, without the image dye spectra, is not sufficient. The type of colorimetric values must be explicitly encoded, or a reference to them encoded, in the original image so that the algorithm can recreate its appearance using referenced or included ancillary information. To be acceptable, the colorimetric values plus ancillary information must define the exact appearance of the original image under a reference condition. The types of colorimetric values that can be used include, but are not restricted to, CIE color spaces such as CIELAB or CIELUV requiring specifically encoded, referenced in a database, or assumed illuminate and reference white, perceptually-uniform color spaces such as MUNSELL, tristimulus values along with their primaries, and status densitometry along with specifically encoded representative spectral curves for the colorants in the print material or the specified or assumed identity of these colorants enabling the copy algorithm to retrieve their spectral data from available databases.

Each of the areas 18,26,28 in the image are selected based on their colorimetric values and the physical size of the region that has substantially the same colorimetry. Larger areas ensure that the scanner algorithm will accurately identify the image area corresponding to the encoded colorimetric values.

It is preferred that the reference areas, which in the present application correspond to areas 18,26,28, should be colorimetrically uniform over at least a 1 mm square to minimize the chance for copy algorithm errors.

The physical location of the reference areas 18,26,28 must be encoded in a way that enables an algorithm to correctly locate them from a scanned image of arbitrary resolution. This constraint requires that the reference areas 18,26,28 be specified using a coordinate system, such as Cartesian, based on a specific print orientation. By encoding the location of areas 18,26,28 as the fractions of the entire print length and width relative to a specified print corner, the copy algorithm can determine which scanned pixel corresponds to this image coordinate, as long as the physical dimensions of the current image have not been altered from the original image.

Alternatively, the encoded locations of two of the specific areas 18,26,28, having unique colorimetry relative to the rest of the image, may be used as the reference points for a coordinate system that is used to specify the locations of the reference regions. The distinguishing characteristics of these coordinate system reference points need to be encoded to enable the algorithm to find them. The advantage of this method of referencing is that if the size or shape of the original print has been altered, the remaining portion of the original image, that is, the current image, can be recreated by the copy algorithm.

If the change model of the media for print 10 is linear and colorant-independent for all colorants in some color metric, a single image area may be sufficient to recreate the appearance of the original image. Thus, only one area need be provided, for example, only area 18. In this case, a mid-to-upper near-neutral density region in the print is selected. The algorithm uses the colorimetry values of the actual current print region along with the encoded original colorimetry values to linearly scale all pixel values above an assumed print material Dmin colorimetry. A preferred method is to encode the print material Dmin colorimetry values to use for the linear scaling adjustment.

When the change model of the media is not linear but is still colorant-independent, at least three areas in the image are referenced that are near neutral but differ in that they have low, medium, and high density. Alternatively, if no suitable neutral regions exist in the image, >2 regions are selected so that the referenced areas include low, medium, and high density values for all colorants. As indicated above, it is preferred to include a colorimetric specification of the hardcopy print material Dmin.

When the change model of the media includes a dependency of one colorant on the amount of another colorant, a matrix of reference areas should be used that covers low, medium, and high densities of each colorant in combination with low, medium, and high densities of the other colorants. To completely describe such a print material, a 3×3×3 matrix of points would be necessary. However, it is only essential to include reference areas that illustrate the actual colorant dependence over the range of colorants actually used in the original hardcopy image. It is preferred to encode the print material Dmin colorimetric values.

To enable the copy algorithm to produce a copy of the current print that matches the appearance of the original print in the case where the new print is a cropped portion and/or smaller than the original print, it is recommended that redundant area colorimetry/location information be encoded on the original print. This strategy also enables improved results when a portion of the current image has been changed in a different manner than other portions of the current image.

The colorimetric and location information may be encoded in a non-pictorial image area on the front of the hardcopy print or on the back of the print in a manner that is human readable or encoded.

To create an unmagnified high-quality copy of a pictorial print generally requires a scanner resolution >200 pixels/inch. Any scanned image of this resolution or higher is used for decoding the encoded information and creating a copy print that matches the original print.

If the dynamic range of the original image is contained within the dye gamut of the copy media, the original image can be restored exactly. If the dynamic range of the original image exceeds that of the copy media, any portion of the actual original print that exceeds the dynamic range of the copy media should be mapped into the dynamic range of the copy media in an appropriate manner.

In the embodiment described above, the algorithm for modifying and/or comparing the image 12 as scanned and as originally captured is provided by the scanner. However, the present invention is not so limited. Once the information is obtained by the scanner, the algorithm for comparing and/or modifying the scanned image so as to return it to its original captured or produced condition may be accomplished by the printer or other output device. Thus, the information relating to the fade characteristics, or any other characteristic, may be stored in the output device or computer, leaving the scanner to obtain the code and other information necessary for the output device to accomplish is modifying of the image 12.

The invention has been described in detail with particular reference to certain preferred embodiments thereof, but it will be understood that variations and modifications can be effected within the scope of the invention.

PARTS LIST

10 Hardcopy print
12 Digital image
14 Informational data
16 Code
18 Red area
20,21 Coordination points
22 Pixels
23 Enlarged area
26 Green area
28 Blue area
30 Digital scanner
31 Upper right quadrant
33 Arrow
35 Lower quadrant
37 Arrow
39 Lower right quadrant
41 Arrow
43 Upper left quadrant
45 Arrow
47 Output device
49 Computer

What is claimed is:

1. A print having an image formed thereon, said print having informational data relating about the print as originally printed, said informational data comprises a personal printing or display profile, said informational data is provided by a code on the print which identifies a location in a memory device wherein said personal printing or displaying the profile is stored.

2. A print according to claim 1 wherein said personal printing or display profile comprises a color visual print characteristic.

3. A print according to claim 2 wherein said visual print characteristic comprises color saturation or contrast.

4. A print according to claim 1 wherein said memory device is at a remote computer or database.

5. A print having an image formed thereon, said print having informational data relating about the print as originally printed and is provided in the image such that it is visually indistinguishable from said image, said informational data relating to how the print was formed.

6. A print according to claim 5 wherein said informational data comprises the print frame number, format size, or type of printer used.

7. A print according to claim 6 wherein said type of printer is one of the following: thermal, inkjet, silver halide, electrophotographic, optical, or digital.

8. A print according to claim 5 wherein said informational data comprises data which specifies at least one color in the image as originally captured or printed.

9. A method of reprinting an image provided on a print, comprising the steps of:
    a) digitally scanning an image and informational data provided on a print, said informational data containing a colorimetric value of at least one specific area of said image and information relating to the location of said at least one specific area, said digital scanning operation also obtaining the current colorimetric value of said at least one specified area;
    b) comparing the current colorimetric value of said at least one specified area to the colorimetric value provided in said informational data for said at least one specific area; and
    c) adjusting the scanned image of said print in accordance with the informational data, said informational data comprising a personal printing or display profile.

10. A method according to claim 9 wherein said informational data relates to a desired visual characteristic.

11. A method according to claim 10 wherein said desired visual characteristic comprises color saturation or contrast.

* * * * *